US010838932B2

(12) United States Patent
Marrelli et al.

(10) Patent No.: US 10,838,932 B2
(45) Date of Patent: *Nov. 17, 2020

(54) DATA CLEANSING AND GOVERNANCE USING PRIORITIZATION SCHEMA

(71) Applicant: International Business Machines Corporation, Armonk, NY (US)

(72) Inventors: Carl M. Marrelli, Westerville, OH (US); Ram S. Narayanan, Canton, MI (US); Martin Oberhofer, Bondorf (DE); Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/798,456

(22) Filed: Oct. 31, 2017

(65) Prior Publication Data

US 2018/0052872 A1     Feb. 22, 2018

Related U.S. Application Data

(63) Continuation of application No. 14/553,303, filed on Nov. 25, 2014, now Pat. No. 9,836,488.

(51) Int. Cl.
*G06F 16/00* (2019.01)
*G06F 16/215* (2019.01)

(52) U.S. Cl.
CPC ................... *G06F 16/215* (2019.01)

(58) Field of Classification Search
CPC .................................................. G06F 16/215
(Continued)

(56) References Cited

U.S. PATENT DOCUMENTS 7,403,942 B1 *   7/2008   Bayliss ................ G06F 16/215
                                                             707/748
7,676,522 B2     3/2010   Klein
                    (Continued)

OTHER PUBLICATIONS

Baudel, "From Information Visualization to Direct Manipulation: Extending a Generic Visualization Framework for the Interactive Editing of Large Datasets", Proceedings of the 19th Annual ACM Symposium on User Interface Software and Technology, Oct. 2006, ACM, pp. 67-76.

(Continued)

*Primary Examiner* — Shiow-Jy Fan
(74) *Attorney, Agent, or Firm* — Feb Roman Cabrasawan; Edell, Shapiro & Finnan, LLC

(57) ABSTRACT

According to an embodiment of the present invention, a computer-implemented method of cleansing data is provided that comprises determining a criticality score and a complexity score for identified attributes of an enterprise, wherein the criticality score represents a relevance of an attribute to one or more enterprise dimensions and the complexity score represents complexity of cleansing data for an attribute. The identified attributes for data cleansing based on the criticality and complexity scores are prioritized, and data of the identified attributes is cleansed in accordance with priority of the identified attributes. Embodiments further include a system, apparatus and computer readable media to cleanse data in substantially the same manner as described above.

17 Claims, 10 Drawing Sheets

(58) Field of Classification Search
USPC .......................................................... 707/692
See application file for complete search history.

(56) References Cited

U.S. PATENT DOCUMENTS

| | | | |
|---|---|---|---|
| 7,827,153 B2 | 11/2010 | Werner et al. | |
| 8,407,191 B1 | 3/2013 | Nanda | |
| 8,463,935 B2 | 6/2013 | Vange et al. | |
| 8,526,316 B2 | 9/2013 | Vishnia-Shabtai et al. | |
| 8,527,394 B2 | 9/2013 | Chung | |
| 8,538,934 B2 | 9/2013 | Hudis et al. | |
| 9,367,608 B1* | 6/2016 | Zhang | G06F 17/271 |
| 9,710,549 B2* | 7/2017 | Betz | G06F 16/2365 |
| 10,223,406 B2* | 3/2019 | Betz | G06F 16/2365 |
| 2002/0002618 A1 | 1/2002 | Vange | |
| 2004/0083199 A1 | 4/2004 | Ovindugari et al. | |
| 2005/0028046 A1 | 2/2005 | McArdle | |
| 2006/0224437 A1 | 10/2006 | Gupta | |
| 2006/0224479 A1 | 10/2006 | Bishop | |
| 2006/0238919 A1 | 10/2006 | Bradley | |
| 2008/0195430 A1 | 8/2008 | Rustagi | |
| 2008/0235288 A1 | 9/2008 | Ben Harush | |
| 2008/0250057 A1 | 10/2008 | Rothstein et al. | |
| 2008/0263062 A1* | 10/2008 | Klein | H04L 41/5009 |
| 2009/0171889 A1 | 7/2009 | Friedlander | |
| 2010/0312737 A1 | 12/2010 | Coldicott | |
| 2011/0289086 A1 | 11/2011 | Jordan | |
| 2012/0254202 A1* | 10/2012 | Heinonen | G06F 16/215 707/754 |
| 2012/0330911 A1 | 12/2012 | Gruenheid | |
| 2013/0073594 A1* | 3/2013 | Jugulum | G06F 16/215 707/802 |
| 2013/0122926 A1 | 5/2013 | Kenington et al. | |
| 2013/0262406 A1 | 10/2013 | Kumar et al. | |
| 2014/0122414 A1 | 5/2014 | Gopalakrishnan | |
| 2015/0278241 A1* | 10/2015 | Bates-Haus | G06F 16/215 707/692 |
| 2016/0147798 A1 | 5/2016 | Marrelli | |

OTHER PUBLICATIONS

Hellerstein, "Quantitative Data Cleaning for Large Databases", United Nations Economic Commission for Europe (UNECE), Feb. 2008, 42 pages.
Bahri et al., "Improvements in Visual Analytics", http://www-scf.usc.edu/~abahri/research.html, Feb. 2014, 7 pages.
List of IBM Patents or Patent Applications Treated as Related, Oct. 2017, 1 page.

* cited by examiner

| Company: | |
|---|---|
| Business Unit: | |
| Region: | |
| System: | |

| Data Domain ▾ | Data Element Description | Used (Y/N) ▾ | Access Type (Publisher / Subscriber) ▾ | Standardized (Y/N) ▾ | Description of Client Standard ▾ | Client Data Owner ▾ |
|---|---|---|---|---|---|---|
| Customer Master | Customer Number | | | | | |
| Customer Master | Customer Name | | | | | |
| Customer Master | Customer Account Group | | | | | |
| Customer Master | House number and street | | | | | |
| Customer Master | City | | | | | |
| Customer Master | Postal Code | | | | | |
| Customer Master | Region (State, Province, County) | | | | | |
| Customer Master | Country | | | | | |
| Customer Master | Legacy Customer Number | | | | | |
| Customer Master | Telephone Number | | | | | |
| Customer Master | Fax Number | | | | | |
| Customer Master | Title | | | | | |
| Customer Master | Industry | | | | | |
| Customer Master | Customer Account Group | | | | | |
| Customer Master | Customer Classification | | | | | |
| Customer Master | Account Number if also Vendor / Creditor | | | | | |
| Customer Master | Nielsen ID | | | | | |
| Customer Master | Tax Number | | | | | |
| Customer Master | Transportation Zone | | | | | |
| Customer Master | Industry Code | | | | | |
| Customer Master | Tax Jurisdiction | | | | | |
| Customer Master | DUNS Number | | | | | |
| Customer Master | Bank country | | | | | |
| Customer Master | Bank account number | | | | | |
| Customer Master | Bank Control Key | | | | | |

FIG.4

| Core Attribute | Existing Standards | | | |
| --- | --- | --- | --- | --- |
| | Business Unit A | Business Unit B | Business Unit C | Corporate Standards |
| City | 50% Existence | No Standards | No Standards | |
| Country | 50% Existence | 10% Existence | No Standards | Standards Exist |
| Customer Account Group | 50% Existence | 10% Existence | No Standards | |
| Customer Name | 50% Existence | No Standards | No Standards | |
| Customer Number | 50% Existence | 100% Conflict | 100% Conflict | |
| Date on which the Record Was Created | 50% Existence | No Standards | No Standards | |
| Fax Number | No Standards | No Standards | No Standards | |
| House number and street | 50% Existence | No Standards | No Standards | |
| Memo | No Standards | No Standards | No Standards | |
| Postal Code | 50% Existence | No Standards | No Standards | |
| Region (State, Province, County) | 50% Existence | 10% Existence | No Standards | Standards Exist |
| Telephone Number | No Standards | No Standards | No Standards | |
| Terms of Payment Key | 50% Existence | No Standards | No Standards | |
| Currency | 50% Existence | No Standards | No Standards | |
| Industry | 50% Existence | No Standards | No Standards | |
| Price group (customer) | 50% Existence | No Standards | No Standards | |
| Shipping Conditions | 50% Existence | No Standards | No Standards | |
| Tax Number | No Standards | No Standards | No Standards | |
| Bank account number | 50% Existence | No Standards | No Standards | |
| Company Code | 50% Existence | 10% Existence | No Standards | |
| Customer classification | 50% Existence | 10% Existence | No Standards | |
| Name of Person who Created the Object | 50% Existence | No Standards | 25% Existence | |
| Sales district | 50% Existence | 10% Existence | No Standards | |
| Division | 50% Existence | 70% Existence | No Standards | |
| Account number of an alternative payer | No Standards | No Standards | No Standards | |
| Customer group | 50% Existence | No Standards | No Standards | Standards Exist |
| Tax Jurisdiction | 50% Existence | No Standards | No Standards | |
| Delivering Plant (Own or External) | 50% Existence | No Standards | No Standards | |

| | Enterprise Domain | Enterprise Attribute | Enterprise Impact | MWV Strategic Initiatives | Strategic KPI | In-Flight Project | Big 5 Data Domain | Business Impact | Data Volume | Cleansing Strategy |
|---|---|---|---|---|---|---|---|---|---|---|
| 1 | Customer | City | Core | Strategic Initiative | KPI Yes | In-flight Yes | Customer/Finance | Some Impact | High Volume | Automated |
| 2 | Customer | Country | Core | Strategic Initiative | KPI Yes | In-flight Yes | Customer/Finance | Some Impact | High Volume | Automated |
| 3 | Customer | Customer Account Group | Core | Strategic Initiative | KPI Yes | In-flight Yes | Customer/Finance | Some Impact | High Volume | Automated |
| 4 | Customer | Customer Name | Core | Strategic Initiative | KPI No | In-flight Yes | Customer/Finance | Some Impact | High Volume | Hybrid |
| 5 | Customer | Customer Number | Core | Strategic Initiative | KPI No | In-flight Yes | Customer/Finance | High Impact | High Volume | Hybrid |
| 8 | Customer | House number and street | Core | Strategic Initiative | KPI No | In-flight Yes | Customer/Finance | Some Impact | High Volume | Automated |
| 9 | Customer | Memo | Core | Strategic Initiative | KPI Yes | In-flight Yes | Customer/Finance | No Impact | High Volume | Manual |
| 10 | Customer | Postal Code | Core | Strategic Initiative | KPI Yes | In-flight Yes | Customer/Finance | Some Impact | High Volume | Automated |
| 11 | Customer | Region (State, Province, County) | Core | Strategic Initiative | KPI No | In-flight Yes | Customer/Finance | High Impact | High Volume | Automated |
| 13 | Customer | Terms of Payment Key | Core | Strategic Initiative | KPI No | In-flight Yes | Customer/Finance | Some Impact | High Volume | Hybrid |
| 14 | Customer | Currency | Core | Strategic Initiative | KPI Yes | In-flight Yes | Customer/Finance | No Impact | High Volume | Automated |
| 15 | Customer | Industry | Core | Strategic Initiative | KPI No | In-flight Yes | Customer/Finance | High Impact | High Volume | Hybrid |
| 16 | Customer | Price group (customer) | Core | Strategic Initiative | KPI No | In-flight Yes | Customer/Finance | Some Impact | High Volume | Hybrid |
| 17 | Customer | Shipping Conditions | Core | Strategic Initiative | KPI Yes | In-flight Yes | Customer/Finance | High Impact | High Volume | Hybrid |
| 18 | Customer | Tax Number | Core | Strategic Initiative | KPI Yes | In-flight Yes | Customer/Finance | Some Impact | High Volume | Hybrid |
| 19 | Customer | Bank account number | Core | Strategic Initiative | KPI No | In-flight Yes | Customer/Finance | Some Impact | High Volume | Hybrid |
| 20 | Customer | Company Code | Core | Strategic Initiative | KPI No | In-flight Yes | Customer/Finance | Some Impact | High Volume | Hybrid |
| 21 | Customer | Customer classification | Core | Strategic Initiative | KPI Yes | In-flight Yes | Customer/Finance | Some Impact | High Volume | Hybrid |
| 23 | Customer | Sales district | Core | Strategic Initiative | KPI Yes | In-flight Yes | Customer/Finance | Some Impact | High Volume | Hybrid |
| 24 | Customer | Division | Core | Strategic Initiative | KPI No | In-flight Yes | Customer/Finance | Some Impact | High Volume | Hybrid |
| 25 | Customer | Account number of an alternative payer | Core | Strategic Initiative | KPI Yes | In-flight Yes | Customer/Finance | Some Impact | High Volume | Hybrid |
| 26 | Customer | Customer group | Core | Strategic Initiative | KPI No | In-flight Yes | Customer/Finance | Some Impact | High Volume | Hybrid |
| 27 | Customer | Tax Jurisdiction | Core | Strategic Initiative | KPI No | In-flight Yes | Customer/Finance | High Impact | High Volume | Hybrid |
| 28 | Customer | Delivering Plant (Own or External) | Core | Strategic Initiative | KPI No | In-flight Yes | Customer/Finance | Some Impact | High Volume | Hybrid |

FIG. 7B

| | Enterprise Domain | Enterprise Attribute | Core Criticality | Core Complexity | Occurance | Concat | Designation | Additional Notes (Optional) |
|---|---|---|---|---|---|---|---|---|
| 1 | Customer | City | 39 | 13 | 6 | 3913 | Planned Initiative | |
| 2 | Customer | Country | 39 | 13 | 6 | 3913 | Planned Initiative | |
| 3 | Customer | Customer Account Group | 39 | 13 | 6 | 3913 | Planned Initiative | |
| 4 | Customer | Customer Name | 39 | 7 | 5 | 3907 | Planned Initiative | |
| 5 | Customer | Customer Number | 31 | 5 | 6 | 3105 | Planned Initiative | |
| 8 | Customer | House number and street | 31 | 13 | 2 | 3113 | Planned Initiative | |
| 9 | Customer | Memo | 31 | 11 | 1 | 3111 | Planned Initiative | |
| 10 | Customer | Postal Code | 31 | 13 | 2 | 3113 | Planned Initiative | |
| 11 | Customer | Region (State, Province, County) | 39 | 13 | 6 | 3913 | Planned Initiative | |
| 13 | Customer | Terms of Payment Key | 31 | 5 | 6 | 3105 | Planned Initiative | |
| 14 | Customer | Currency | 39 | 13 | 6 | 3913 | Planned Initiative | |
| 15 | Customer | Industry | 39 | 13 | 6 | 3913 | Planned Initiative | |
| 16 | Customer | Price group (customer) | 31 | 5 | 6 | 3105 | Planned Initiative | |
| 17 | Customer | Shipping Conditions | 31 | 7 | 13 | 3107 | Planned Initiative | |
| 18 | Customer | Tax Number | 31 | 5 | 6 | 3105 | Planned Initiative | |
| 19 | Customer | Bank account number | 31 | 5 | 1 | 3105 | Planned Initiative | |
| 20 | Customer | Company Code | 39 | 5 | 5 | 3905 | Planned Initiative | |
| 21 | Customer | Customer classification | 39 | 7 | 5 | 3907 | Planned Initiative | |
| 23 | Customer | Sales district | 39 | 7 | 5 | 3907 | Planned Initiative | |
| 24 | Customer | Division | 31 | 7 | 13 | 3107 | Planned Initiative | |
| 25 | Customer | Account number of an alternative payer | 39 | 7 | 5 | 3907 | Planned Initiative | |
| 26 | Customer | Customer group | 31 | 5 | 6 | 3105 | Planned Initiative | |
| 27 | Customer | Tax Jurisdiction | 31 | 7 | 13 | 3107 | Planned Initiative | |
| 28 | Customer | Delivering Plant (Own or External) | | | | | | |

DATA CLEANSING AND GOVERNANCE USING PRIORITIZATION SCHEMA

CROSS-REFERENCE TO RELATED APPLICATIONS

This application is a continuation of U.S. patent application Ser. No. 14/553,303, entitled "DATA CLEANSING AND GOVERNANCE USING PRIORITIZATION SCHEMA" and filed Nov. 25, 2014, the disclosure of which is incorporated herein by reference in its entirety.

BACKGROUND

1. Technical Field

Present invention embodiments relate to data cleansing and governance, and more specifically, to performing data cleansing and governance in a systematic and methodical way, allowing organizations to prioritize efforts in order to meet project demands and schedules.

2. Discussion of the Related Art

When implementing an Enterprise Resource Planning (ERP), Master Data Management (MDM), Big Data, Data Warehouse (DW), or other type of information integration project, customers typically design project schedules to conclude when all data is 100% clean and 100% available, also referred to as "Day 1" of "Go-Live." This type of endpoint often causes customers trouble with meeting specified deadlines, as attempting to cleanse, convert, and migrate heavy or large volumes of data from legacy systems to target systems may be time consuming, leading to scheduling delays and associated budget increases.

SUMMARY

According to an embodiment of the present invention, a computer-implemented method of cleansing data is provided that comprises determining a criticality score and a complexity score for identified attributes of an enterprise, wherein the criticality score represents a relevance of an attribute to one or more enterprise dimensions and the complexity score represents complexity of cleansing data for an attribute. The identified attributes for data cleansing based on the criticality and complexity scores are prioritized, and data of the identified attributes is cleansed in accordance with priority of the identified attributes. Embodiments of the present invention further include a system, apparatus and computer readable media to cleanse data in substantially the same manner as described above.

These and other aspects, features and advantages of embodiments of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of present invention embodiments are examples and explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

FIG. 4 is an illustration showing an example template for collecting attributes across an enterprise in accordance with an embodiment of the present invention.

FIG. 5 is an illustration showing an example set of core attributes in accordance with an embodiment of the present invention.

FIGS. 7A-7B are illustrations showing example output for a set of attributes executed through the prioritization schema in accordance with an embodiment of the invention.

DETAILED DESCRIPTION

Figure 1:
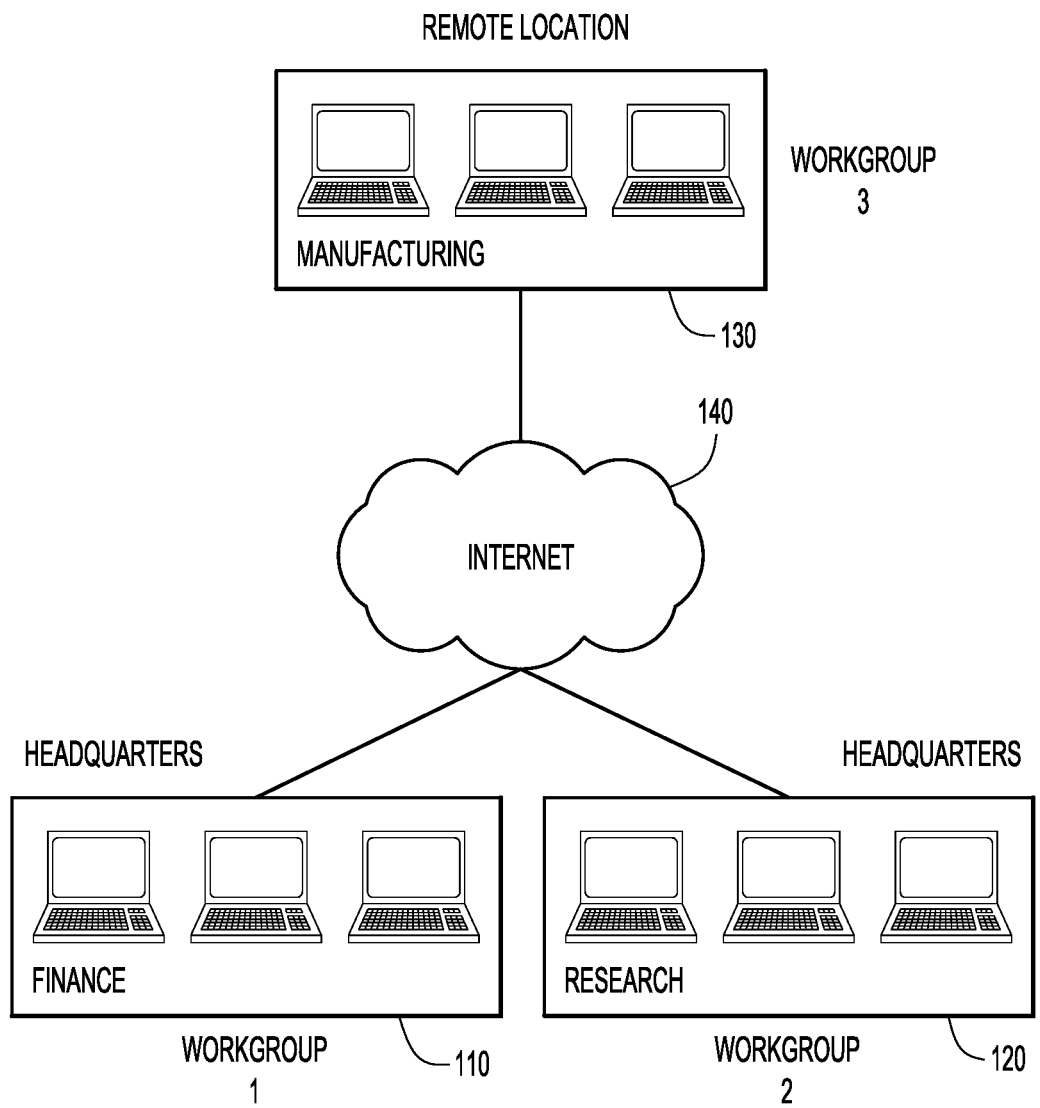
FIG. 1 is an illustration showing an example of data distribution across an enterprise network in accordance with an embodiment of the present invention.

For any large ERP, MDM, Big Data, DW or other type of information integration implementation, major effort is needed for data preparation. This effort largely includes cleansing, converting, and migrating data from legacy systems or other sources to target systems. While rules and logic may be applied for the conversion and migration process, the cleansing effort is more subjective in nature. For example, applicable questions during the cleansing process may include: (1) How much data should be cleansed? (2) How far back in history should data be retrieved/selected for cleansing? (3) Which data is universally important to all teams/groups and which is not? (4) Does the data selected for cleansing support the business process(es) in question? (5) Whose view or lens, e.g., group, department, position, etc., is taken into consideration when deciding which data to cleanse?

The cleansing effort, often lead and managed by the customer's business teams and system integrators, is often the biggest hurdle due to its subjective nature. For example, clean data from the perspective of a first group, may not necessarily be considered to be clean data from the perspective of a second group. While some fields may look the same to both groups, these fields may not be defined the same way, and therefore, may not contain the same type of information and may not be used the same way.

Additionally, in many cases, a default position of cleaning all data is adopted and data cleansing becomes the critical path of the project, resulting in teams exceeding projected budgets and missing deadlines. Efforts to clean data frequently fail because business teams are unsatisfied with the way in which data was cleansed, and large volumes of data result in scheduling delays and exceeding budget constraints.

Present invention embodiments utilize a methodical and quantifiable schema that takes a subjective process, such as data cleansing, and provides a manner in which to turn the subjective process into an objective process. By identifying a priority for each data attribute according to a standardized process, a strategy and approach can be established for: (1) cleansing, converting, and harmonizing data in order to streamline and prioritize project efforts, (2) correctly assessing the scope of data to be cleansed, and (3) allowing a structure to be implemented to govern the data cleansing process moving forward. This prioritization schema removes subjective criteria, e.g., opinions, thoughts, feelings, etc., and performs calculations in order to determine data importance and prioritization of efforts.

Present invention embodiments allow data attributes, and thus the data cleansing process, to be prioritized even when opinions from multiple sources differ on criteria for establishing clean data. In some embodiments, this prioritization schema may be based on: (1) data metrics, (2) grading schemas, and (3) weighing logic. Data metrics may include criticality and complexity scores. Grading schemas may include: (1) enterprise data domains, e.g., customer, vendor, material, human resources, financial, etc. and (2) corresponding attributes. Data quality grades as part of an enterprise data strategy may also be applied. For example, data quality grades may be metrics or characteristics of information quality, which may be assessed to determine the level of quality that is present within that data. These characteristics may include data completeness, validity, consistency, timeliness, accuracy, security and accessibility.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

With reference now to FIG. 1, an example enterprise environment for use with present invention embodiments is illustrated. Specifically, the environment includes a plurality of workgroups 110-130, with one or more workgroups in a remote location, and connected via network 140. Each workgroup may comprise a plurality of computing devices, e.g., server systems and client systems, corresponding to a corporate business or other unit, e.g., Manufacturing, Research, Finance, etc.). Workgroups may be remote from each other and communicate over network 140. The network may be implemented by any number of any suitable communications media (e.g., wide area network (WAN), local area network (LAN), Internet, Intranet, etc.). Alternatively, workgroups may be local to each other, and communicate via any appropriate local communication medium (e.g., local area network (LAN), hardwire, wireless link, Intranet, etc.).

Each workgroup may have a corresponding set of data attributes, corresponding to data relevant to a particular workgroup. In some cases, a data attribute of a first workgroup may be identical to a data attribute of a second workgroup. In other cases, the name of the data attribute may be the same among workgroups, but the function of the data attribute may be different. In still other cases, a data attribute may be unique among various workgroups.

As another example, in the enterprise data management world, multiple data domains exist, such as: (1) material master, (2) customer master, (3) employee master, (4) vendor master, (5) financial data (e.g., general ledger, company data, cost centers, etc.). Each data domain may have a list of corresponding attributes, and these attributes may be itemized according to the prioritization schema and assigned a corresponding weight.

Figure 2:
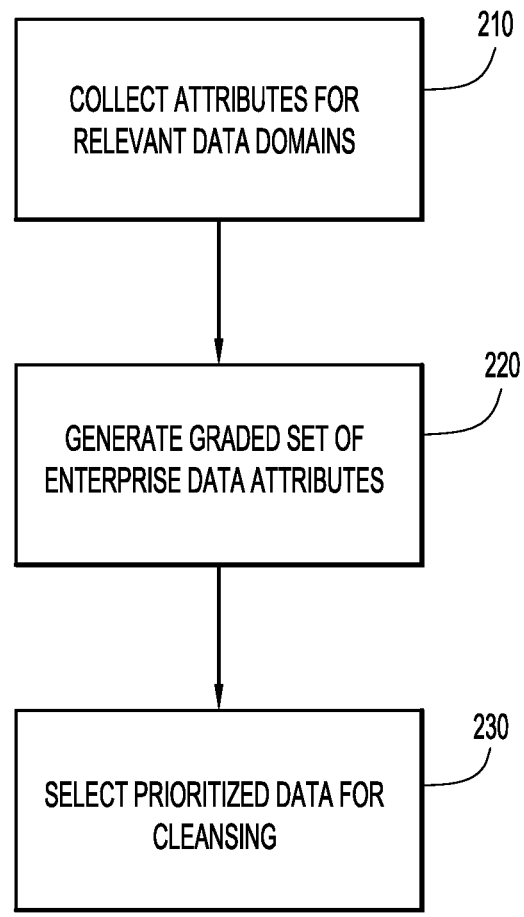
FIG. 2 is a procedural flow chart of collecting, grading, and selecting prioritized attributes in accordance with an embodiment of the present invention.

With reference to FIG. 2, a procedural flowchart is provided showing an example of collecting, grading, and selecting prioritized attributes according to present invention embodiments. At operation 210, attributes for relevant data domains, e.g., a corporate business unit, etc., are collected. At operation 220, a graded set of enterprise data attributes are generated. For example, attributes may be graded based upon data metrics as disclosed herein. At operation 230, data attributes are prioritized, and selected based upon priority for data cleansing.

Figure 3:
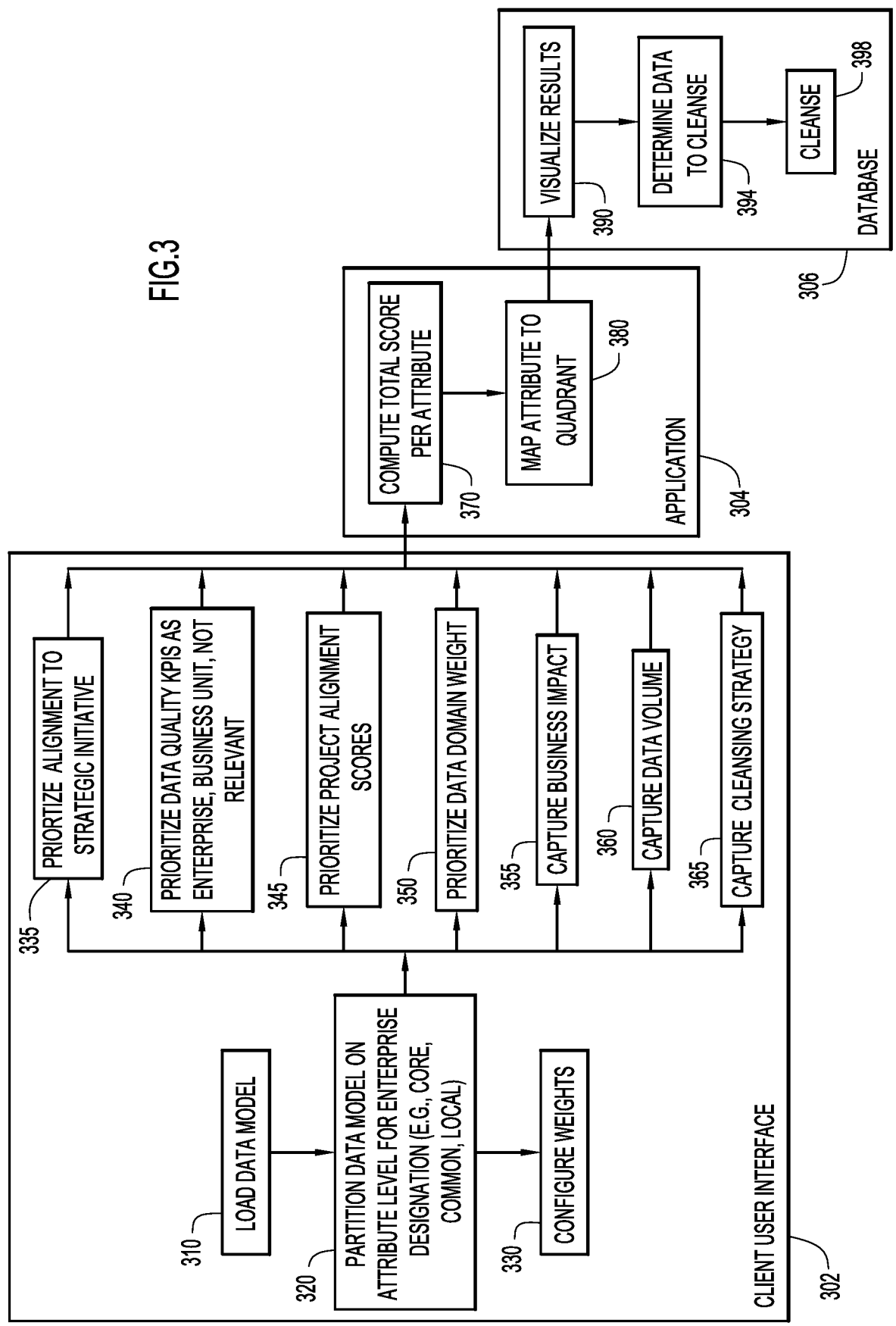
FIG. 3 is a procedural flow diagram of a more specific example of collecting, grading and selecting prioritized attributes in accordance with an embodiment of the present invention.

Referring to FIG. 3, a more detailed procedural flowchart is presented, according to present invention embodiments. A Client User Interface (UI) 302 may provide users with the ability to perform input steps highlighted in the corresponding black box. The Client UI may be a Web UI and/or a Mobile UI to allow functional data analysts to work concurrently on various tasks either by data domain and/or business unit. Application 304 contains the implementation of the prioritization schema and interacts with the Client UI. For example, an implementation of the prioritization schema may be a Java implementation using a J2EE standard, and the application may be deployed using a J2EE runtime environment such as WebSphere Application Server. The Application 304 may be executed on a client device, or on any device that the client device is able to communicate with. Results may be visualized using files, (e.g., flat files, spreadsheets, graphs, etc.) or a database. For example, a relational database system such as Oracle or DB2 may be used.

At operation 310, a data model is loaded. The data model may contain a list of attributes. At operation 320, the data model is partitioned based upon the attribute designation, e.g., whether the attribute is core data, common data or local data.

Core Data includes data attributes that span the entire enterprise, such as elements that are maintained across all or almost all the systems, spanning all platforms in scope and most strategic business units. Core data is considered an enterprise asset, and accordingly, enterprise-wide definitions, standards, processes and cleansing strategies should encompass all core data attributes.

Common Data includes data attributes that span most of the enterprise, such as elements that are maintained across a majority of the systems and/or business units. Ideally, common data should be addressed holistically across the systems in which the data is maintained, and definitions and standards should be shared for common data attributes.

Local Data includes data attributes specific to a region, system or business unit. While standardization and quality monitoring is always a good practice, these activities should be handled locally and not as enterprise initiatives.

At operation 330, weighing logic is configured as shown at operations 335-350. At operations 335-350, various parameters are prioritized, e.g., Alignment to Strategic Initiative(s), Data Quality Key Performance Indicators (KPIs), e.g., enterprise, business unit, or not relevant, Synergy with Current or Planned Initiatives/Project Alignment Scores, as well as Corporate Domain Importance/Data Domain Weight, as part of generating a criticality score. Prioritization of these parameters as well as criticality scoring is described in additional detail herein.

At operations 355-365, business impact, data volume, and cleansing strategy are captured, as part of generating a complexity score. Operations 355-365 as well as complexity scoring are described in additional detail herein. In some embodiments, operations 310-365 may be performed by a user via the client user interface 302.

Operations 370-380 are application specific. At operation 370, for each attribute, a total score is computed. At operation 380, attributes may be mapped to a quadrant/prioritization matrix, as described in additional detail herein. At operation 390, results may be visualized using any suitable device, e.g., flat data file, database, etc. At operation 394, attributes/data to be cleansed is selected, based upon the prioritized data. At 398, data is cleansed.

FIGS. 4-8B provide examples of the various operations of FIG. 3. It is understood that FIGS. 4-8B represent one possible embodiment of the embodiments, described herein. These examples are in no way intended to limit the scope of present invention embodiments disclosed herein.

FIG. 4 is an illustration showing an example template for collecting attributes for a customer data domain 410 in an enterprise. In some embodiments, the attribute list may be organized by data domain and provided to the client device in worksheet/spreadsheet form. The attribute list for a data domain contains a list of attributes which are determined to be in scope for the data strategy, e.g., a data conversion, data migration, etc. A description of each data attribute is shown at 420. Additional types of information may be gathered with regard to collecting attribute information, including whether the attribute is used (e.g., Used 430), who has access to the attribute (e.g., Access Type 440), whether the attribute is standardized across different data domains (e.g., Standardized 450), information explaining client standardization (e.g., Description of Client Standard 460), and who owns the data (e.g., Data Owner 470).

Data attributes may be compared across the enterprise landscape, e.g., business units, regions, systems, etc., analyzed and classified with an enterprise designation, e.g., core/common/local. This applies to key data attributes for each of the master data domains in scope. Additionally, existing standards may be analyzed for potential conflicts and gaps.

Referring to FIG. 5, a list of core attributes is shown at 510. A summary of existing standards for different business units is shown at 520.

Once data usage information has been collected from a suitable number of endpoints to represent the scope that a particular attribute is used across the enterprise, results may be fed through the prioritization schema. As part of this prioritization schema, a relative priority, as previously disclosed in operations 335-350, is assigned to each attribute identified through the strategic data effort. In some embodiments, the prioritization schema may apply data metrics, e.g., assign a weight, to each attribute of a data domain based upon schema dimensions. Additionally, complexity scoring may be performed, as previously disclosed at operations 355-365. Attributes may be measured against each of the schema dimensions, criticality and complexity, and assigned a criticality and complexity weight/score based on a predetermined grading scale. The schema dimensions, criticality and complexity as well as weighting metrics, are described in additional detail throughout the specification as well in the following paragraphs.

Each enterprise attribute is evaluated on a scale (e.g., on a scale from 0 through 9) as to the relevance of the attribute with respect to the corresponding dimension, e.g., criticality or complexity. Criticality is a measure of how important an attribute is across various data domains of an enterprise. Complexity is a measure of the projected effort needed to standardize an attribute. The scores are aggregated to create composite criticality and complexity scores for each enterprise attribute. For criticality, a higher number implies the attribute is more critical. For complexity, a lower number implies more complexity. In practice, the grading scale for each dimension may be adjusted per direction of the project team based on specific priorities for the customer.

A criticality weight is assigned to each attribute based on a core/common/local enterprise designation 320 as well as on additional criticality factors. These additional factors may include: "Alignment to a strategic initiative" 335, "Relative to a strategic KPI" 340, "Synergy with current/planned initiatives" 345, and "Corporate domain importance (data domain specific weight)" 350.

Regarding the factor "Enterprise designation" 320, the prioritization schema assigns core data attributes a heavy weight, common attributes a lesser weight, and local attributes a light weight. An example weighting schema for an enterprise designation may include assigning "Core data attributes" a value of 9, "Common data attributes" a value of 3, and "Local data attributes" a value of 1.

Regarding the factor "Alignment to a strategic initiative" 335, standardization of data directly associated to core business functions and strategic priorities of the customer are assigned a heavier criticality weight. For example, attributes with a direct impact to core business functions, such as data elements central to financial reporting, may have the heaviest weight. Data attributes relevant to enterprise strategic initiatives such as commercial excellence or innovation, and emerging markets may receive a middle weight. Data attributes relevant to business unit strategic initiatives may receive a lower weight. Those attributes without relevance to a strategic initiative may receive a zero score.

An example weighting schema for "Alignment to a strategic initiative" 335 may include assigning attributes designated as "Relevant to a Core Business Function" with a value of 9, "Relevant to an Enterprise Strategic Initiative" with a value of 3, "Relevant to a Business Unit Strategic Initiative" with a value of 1, and "No Strategic Relevance" with a value of 0.

Regarding the factor "Relative to a strategic KPI" 340, standardization of data directly associated with a strategic KPI is assigned a heavier criticality weight. As a prerequisite, enterprise KPI's are collected and analyzed for data attribute associations. An example weighting schema may include assigning attributes determined to be "Relevant to an Enterprise KPI" with a value of 9, "Relevant to a Business Unit KPI" with a value of 3, and "Not Relevant to a Key Performance Indicator" with a value of 1.

Regarding the factor "Synergy with current/planned initiatives" 345, standardization of data aligned with current or planned initiatives is assigned a heavier criticality weight. This includes specific data in systems scheduled for transformation. For example, if a company was planning a transformation of their financial system(s), standardization of financial data would be aligned with this initiative, increasing the synergy for this effort. An example weighting schema may include assigning attributes determined to be "Aligned with a planned/in-flight initiative" with a value of 9, and "No Alignment with planned/in-flight initiatives" with a value of 1.

Regarding the factor "Data domain specific weight" 350, consideration is also given to the data domain an attribute belongs to. Because customers may desire to focus standardization efforts to a specific data domain, or already have a good handle on a particular domain, criticality weight is given to desired areas of focus and removed for already standardized domains. An example weighting schema may include assigning attributes determined to have a "Data domain with high customer focus" with a value of 9, "Data domain with some customer focus" with a value of 3, and "Data domain with low customer focus/already standardized" with a value of 1.

Once key attributes are assigned criticality weights, these key attributes are weighted in regards to another dimension, complexity. A complexity weight is assigned based on three complexity factors, reflective of an effort to standardize an attribute. These factors may include: Business Impact 355, Data Volume 360, and Cleansing Strategy 365.

Regarding factor "Business Impact" 355, data attributes that directly impact the business add complexity to standardization and cleansing efforts. Those with high business impact may require a strategic plan due to impact on the client device as well as its customers and vendors. These attributes are assigned a low score (recall that higher weight refers to ease in this model). Those with some manageable impact to the business are assigned a middle score and those with no foreseeable impact are assigned a heavy score. An example weighing schema may include assigning attributes having a "Data domain with high business impact" with a value of 1, "Data domain with medium business impact" with a value of 3, and "Data domain with low business impact" with a value of 9.

Regarding "Data volume" 360, data volume contributes to the complexity of a data standardization effort. Higher volumes of non-standardized data add to the complexity. As part of an enterprise data strategy, a relative score is assigned for the data within each system and averaged. An example weighting schema may include assigning attributes determined to have a "Volume of data is relatively high" with a value of 1, "Volume of data is relatively medium" with a value of 3, and "Volume of data is relatively low" with a value of 9.

Regarding "Cleansing strategy" 365, the manner of cleansing the non-standardized data contributes to the complexity of the cleansing effort. If automation can be applied, the complexity is lighter than one in which manual intervention is necessary. An example of automation is for address standardization, where tools can be used to assist in this effort. Some data attributes, however, require specific manual interaction when cleansing. While manual cleansing may work for small data volumes, risk of error increases as data volume increases, and therefore, the complexity is also increased. An example weighting schema includes assigning attributes in which "The cleansing effort will be executed manually" with a value of 1, "Some data can be cleansed automatically, but some manually" with a value of 3, and "The data can be cleansed automatically with a cleansing tool" with a value of 9.

As an example of computing the work effort of a data cleansing initiative, such as cleansing strategy 365, an estimate of the number of hours to complete a project may be computed as follows. This model uses knowledge of business processes, business objects in business processes, tables related to business objects, as well as determining which attribute is in which table to determine if an attribute is shared among multiple business processes. The total number of business objects (BOs) in scope may be calculated as:

$$\#BOs = \#automated\ master\ data\ objects\ i + \#non\text{-}automated\ master\ data\ objects\ j + \#automated\ operational\ data\ objects\ k + \#non\text{-}automated\ operational\ data\ objects\ l$$

Automated means the cleansing is done using ETL cleansing logic. Non-automated means all cleansing for the BOs are done manually. For both Master Data and Operational Data, automated data objects typically need about 7 days build time and 7 days of test time. A first stage is to perform manual cleansing on a small number of records with poor input data quality. A steward can usually resolve 30-50 issues per hour. The parameters for build effort, test effort, and manual resolution effort may vary by project type.

A computation of the number of cleansing hours needed for a data cleansing project may be represented by the following formula:

$$\begin{aligned}\text{Total cleansing hours} = &\text{SUM(automated master data object\_}i*\text{build time}+\text{master data object}*\text{test time}\\&+(\text{manual records/issues resolved per hour})+\text{SUM(non-automated master data object\_}j=\text{manual records/issues resolved per hour})\\&+\text{SUM(automated operational data object\_}k*\text{build time}+\text{operational data object}*\text{test time}\\&+(\text{manual records/issues resolved per hour})+\text{SUM(non-automated operational data object\_}l=\text{manual records/issues resolved per hour})\end{aligned}$$

Referring again to the concept of DQ KPIs, examples of DQ KPIs include, but are not limited to: "Data Completeness", "Data Category Completeness", "Data Validity", and "Standardized". "Data Completeness" measures if a mandatory field contains for each record a value that is not NULL. "Data Category Completeness" measures if a field, which may or may not be mandatory, has a value for cases in which the value is mandatory that is not NULL. For example, customer records are usually organized in customer categories, e.g., one time customer, gold customer, etc., and depending on the category, certain fields may be mandatory in some categories and optional in others. "Data Validity" measures if an attribute with a limited value range (e.g., a range of 0-10, a set of permissible reference data values, etc.), only has values within the permitted range. "Standardized" measures if a particular field only stores the values in a standardized representation. These KPIs, which are all technical in nature, do not reflect the impact of any particular attribute regarding the business-process focused dimensions, e.g., criticality and complexity, and may be measured by profiling tools.

In contrast, the KPIs of present invention embodiments, involved in evaluating complexity and criticality, operate on a different level than DQ KPIs. Resolving compatibility issues for a given attribute is generally low if the application is of low importance or not used in many applications. In contrast, an attribute used in many applications, e.g., a core or common attribute, is generally high as failure to resolve compatibility issues affects multiple processes in multiple applications.

Master data from a business process perspective typically appears in dozens or hundreds of business processes and business process steps within an enterprise, and core and common attributes of master data are shared across operational systems, e.g., lead and campaign management, order entry, order fulfillment, etc., as well as analytical systems, e.g., next best action, churn analytics, profitability analytics, etc. Due to this, criticality dimensions operate on a different level as compared to existing DQ KPIs.

None of the previously discussed technical DQ KPIs (completeness, etc.) consider change impact, data volumes and cleansing efforts (e.g., manual vs. automated). Due to this, complexity dimensions operate on a different level as compared to DQ KPIs.

Figure 6:
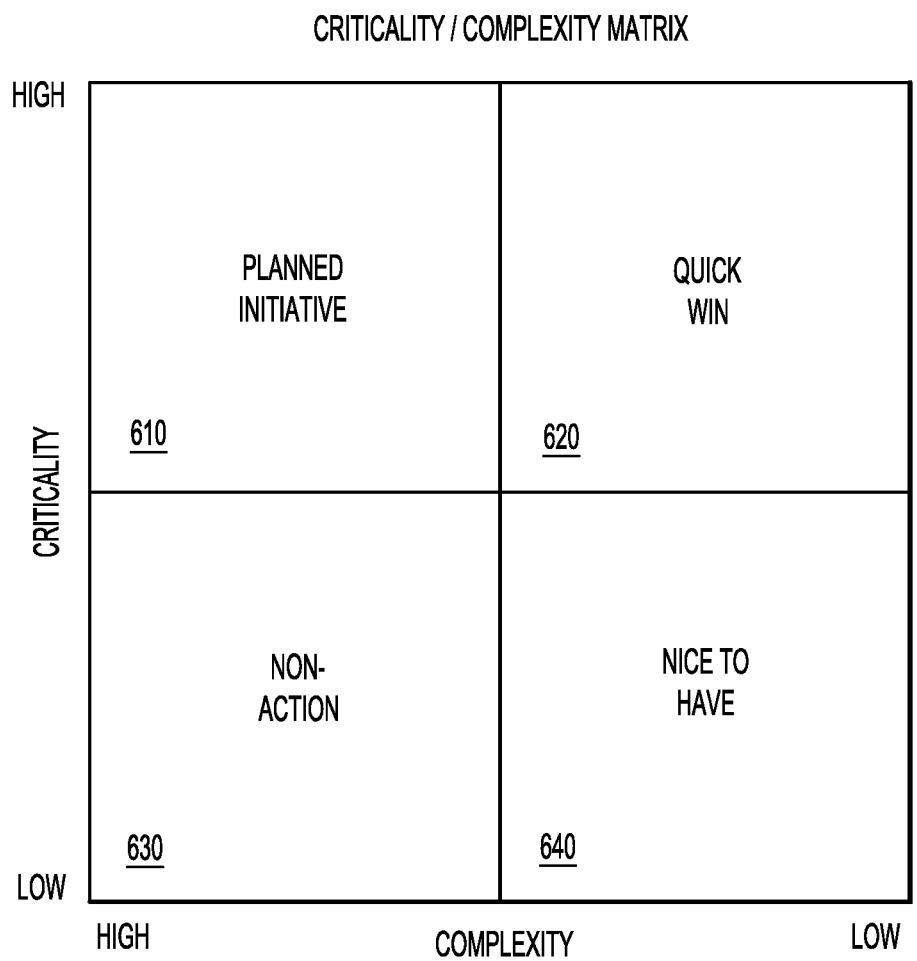
FIG. 6 is an illustration showing an example prioritization matrix for prioritizing attributes in accordance with an embodiment of the present invention.

Referring to FIG. 6, the output of the prioritization schema, a graded set of enterprise data attributes, classified as core, common or local, and prioritized by criticality and complexity dimensions, can be plotted on a criticality/complexity matrix, with each quadrant representing a specific execution strategy for a given set of attributes. FIG. 6 shows four quadrants: "Planned Initiative" 610, "Quick Win" 620, "Non-Action" 630, and "Nice to Have" 640. Each quadrant is described in additional detail herein.

A standardization effort with relatively high criticality and low complexity is designated as a "Quick Win" 620. Quick wins may be executed, e.g., by a Data Governance Organization, with targeted, independent standardization plans and may be planned by a lead data steward. Such efforts are generally short-term in nature and do not need to align directly to a large transformation project.

A standardization effort with relatively high criticality and high complexity is designated as a "Planned Initiative" 610. Planned initiatives may be executed, e.g., by a Data Governance Organization in conjunction with a transformation project, and may be planned by a Data Governance Council with active executive sponsorship. Data stewards work closely with the project team to ensure enterprise standards are understood and followed as data is transformed. Change management and communication is very important with planned initiatives as the data attributes involved frequently have high business impact. Such efforts are generally aligned to a transformation project.

A standardization effort with relatively low criticality and low complexity is designated as a "Nice to Have" 640. Nice to have are executed by a Data Governance Organization as time permits. Targeted, independent standardization plans may be carried out by a small representation of data stewards. These efforts generally live at the tactical level, and relevant plans are communicated to the Data Governance Council as required.

A standardization effort with relatively low criticality and high complexity is designated as a "Non-Action" 630. These attributes are not normally directly addressed by a Data Governance Organization.

Referring to FIGS. 7A and 7B, example images of output for a set of data executed through the prioritization schema is shown. This example focuses on data attributes within the customer domain and the planned initiative quadrant (high criticality/high complexity). In FIG. 7A, information associated with various criticality factors 710 and complexity factors 720 are shown for each attribute. In FIG. 7B, this information has been used to generate overall criticality scores 730 (e.g., based upon the various weighting criteria presented herein, e.g., and the attribute information provided in FIG. 6) and complexity scores 740 based upon scoring criteria. Criticality and complexity factors are shown for each attribute.

Figure 8:
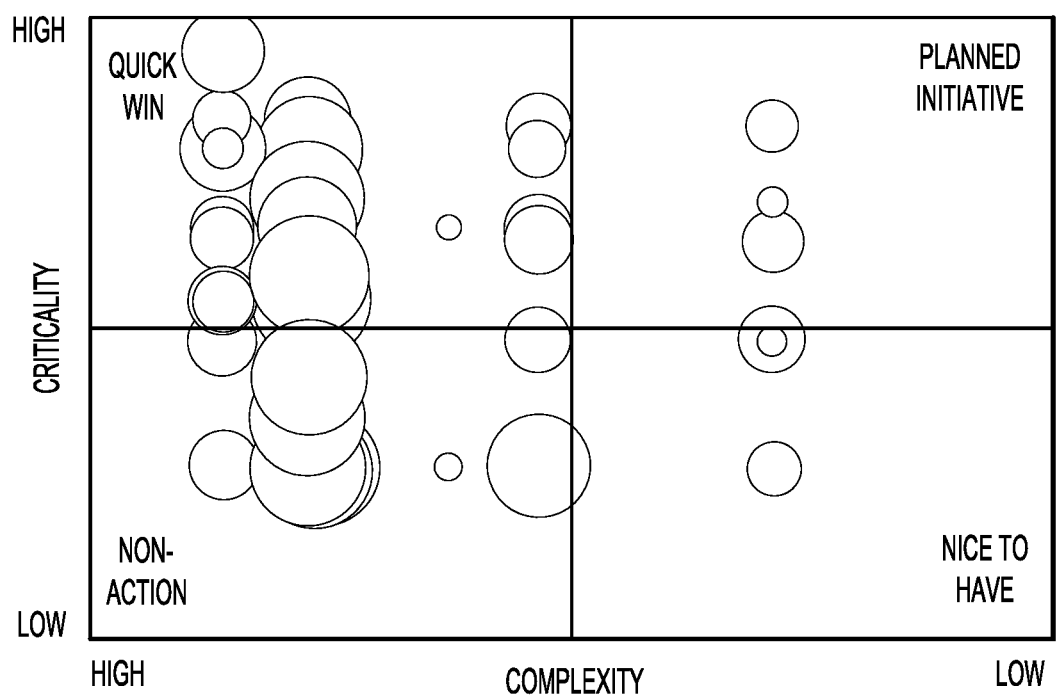
FIG. 8 is an illustration showing spheres having a size corresponding to a number of attributes in a particular region of the prioritization matrix in accordance with an embodiment of the invention.

Referring to FIG. 8, example images of output graphed on the criticality/complexity matrix are shown. The relative size of the spheres indicates the number of attributes in a particular space of the chart.

Benefits of present invention embodiments include: (1) building a consensus within an organization regarding data domains and attributes that need to be heavily governed in order to ensure data integrity during a migration, (2) helping to establish a cleansing and conversion strategy for any project by defining the scope, priority, and volume of data to include, thereby enabling better project planning, avoiding delays, and incurring unexpected costs, (3) helping to determine the scope for building a MDM program, and (4) helping to identify the business processes that need to be re-engineered or optimized in order to support data governance. Additional benefits include (5) measuring new dimensions through a matrix, and (6) visualizing data priorities to determine which attributes are low hanging fruits (e.g., quick wins) from a business priority perspective. Both of these benefits are not currently available through data quality tools available in the marketplace.

Present invention embodiments utilize processor-based computations to prioritize attributes based upon attribute information and grading criteria. Prioritization may be performed in an automated manner, allowing subsets of attributes to be classified into different categories/quadrants having different priorities for cleansing. Significant cost savings may be achieved, data volumes for cleansing reduced, and project deadlines streamlined, due to prioritization of attributes based on the embodiments disclosed herein.

Figure 9:
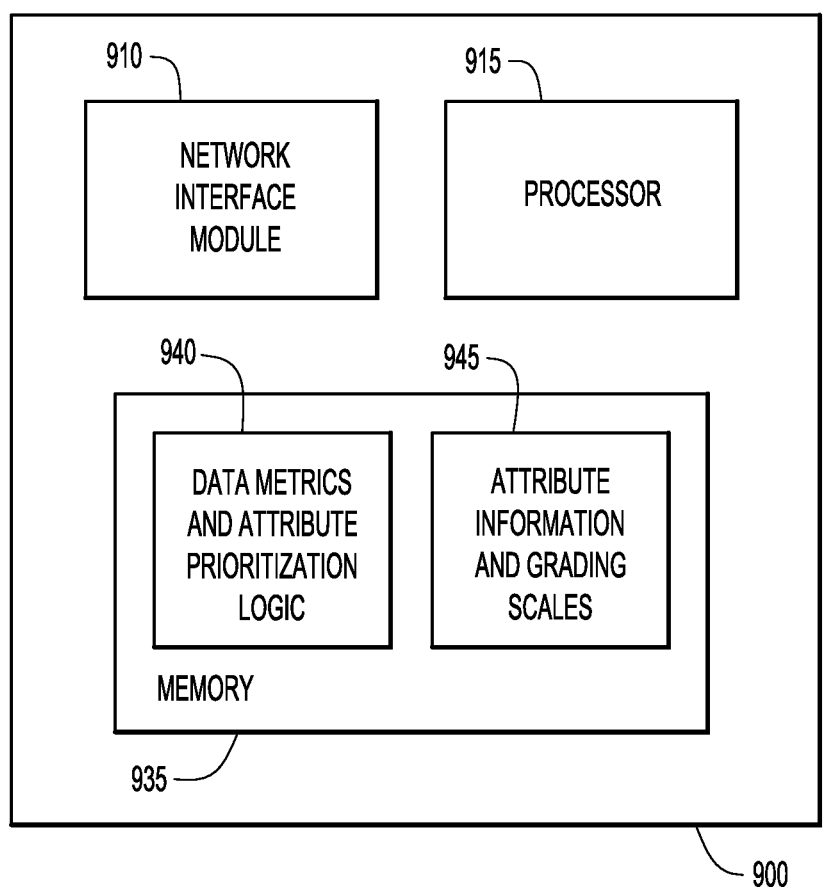
FIG. 9 is a block diagram of an apparatus for prioritizing attributes in accordance with an embodiment of the present invention.

FIG. 9 illustrates an example block diagram of a client system 900, configured to perform the techniques presented herein. System 900 may include a network interface unit 910, a processor 915, and a memory 935. The network interface unit 910 is configured to receive and send data over a network.

The processor 915 may be embodied by one or more microprocessors or microcontrollers, and executes software instructions stored in memory 935, e.g., data metrics and attribute prioritization logic 940 and attribute information and grading scales 945, for criticality and complexity scoring and attribute prioritization, as shown in FIGS. 1-8.

It is noted that client system 900 may be implemented by any conventional or other computer systems preferably equipped with a display or monitor, a base (e.g., including at least one processor 915, one or more memories 935 and/or internal or external network interfaces or communications devices 910 (e.g., modem, network cards, etc.)), optional input devices (e.g., a keyboard, mouse or other input device), and any commercially available and custom software (e.g., server/communications software, browser/interface software, etc.). Client system 900 may be a stand alone computer system. Alternatively, client system 900 may be a computer system in communication with one or more other computers in the enterprise, or may reside in any workgroup shown in FIG. 1.

In some embodiments, client system/device 900 performs computations to determine attribute prioritization. In other embodiments, client system 900 is in communication with a server such that the client system 900 is utilized for inputting data, while the server performs computations (e.g., complexity and criticality scoring) to determine attribute prioritization as well as generate and display relevant graphics.

The various modules (e.g., data metrics and attribute prioritization logic 940, attribute information and grading scales 945, etc.) may be implemented by any combination of any quantity of software and/or hardware modules or units, and may reside within memory 935 of the back end system for execution by processor 915.

Client system 900 enables users to submit documents (e.g., documents with attribute lists, etc.) for attribute prioritization. A database system may store various information pertaining to the analysis (e.g., prioritized attribute information, grading scales, attribute information, etc.). The database system may be implemented by any conventional or other database or storage unit, may be local to or remote from client systems 900, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis, and may provide reports including analysis results (e.g., prioritization matrix, prioritized data, criticality and complexity scores, etc.).

Client system 900 may be implemented by any conventional or other computer systems preferably equipped with a display or monitor, a base (e.g., including at least one processor 915, one or more memories 935 and/or internal or external network interfaces or communications devices 910 (e.g., modem, network cards, etc.)), optional input devices (e.g., a keyboard, mouse or other input device), and any commercially available and custom software (e.g., server/communications software, attribute prioritization module, data metrics/scoring module, attribute information module, browser/interface software, etc.).

Alternatively, one or more client systems 900 may analyze attribute information to determine attribute prioritization when operating as a stand-alone unit. In a stand-alone mode of operation, the client system stores or has access to the data (e.g., attributes, data metrics, grading scales, etc.), and includes modules to determine criticality and complexity scores as well as attribute prioritization. The graphical user (e.g., GUI, etc.) or other interface (e.g., command line prompts, menu screens, etc.) solicits information from a corresponding user pertaining to the desired attribute information, and may provide reports or graphs including analysis results.

Client system 900 may include one or more modules or units to perform the various functions of present invention embodiments described below. The various modules (e.g., attribute prioritization module, data metrics/scoring module, attribute information, etc.) may be implemented by any combination of any quantity of software and/or hardware modules or units, and may reside within memory 935 of the server and/or client systems for execution by processor 915.

It will be appreciated that the embodiments described above and illustrated in the drawings represent only a few of the many ways of implementing embodiments for cleansing data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, etc.). These systems may include any types of monitors and input devices (e.g., keyboard, mouse, voice recognition, etc.) to enter and/or view information.

It is to be understood that the software (e.g., logic to determine criticality and complexity scores, logic to determine prioritized attributes, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., attribute information, input information to determine criticality and complexity scores, output information associated with prioritized attributes, etc.). The database system may be implemented by any number of any conventional or other databases, data stores or storage structures (e.g., files, databases, data structures, data or other repositories, etc.) to store information (e.g., attribute information, input information to determine criticality and complexity scores, output information associated with prioritized attributes, etc.). The database system may be included within or coupled to the server and/or client systems. The database systems and/or storage structures may be remote from or local to the computer or other processing systems, and may store any desired data (e.g., information associated with attributes, prioritized data, grading scales associated with data metrics, etc.).

The present invention embodiments may employ any number of any type of user interface (e.g., Graphical User Interface (GUI), command-line, prompt, etc.) for obtaining or providing information (e.g., attribute information, input information to determine criticality and complexity scores, output information associated with prioritized data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The information associated with prioritized attributes may include any information arranged in any fashion, and may be configurable based on rules or other criteria to provide desired information to a user (e.g., data metrics, data domains, etc.).

The present invention embodiments are not limited to the specific tasks or algorithms described above, but may be utilized for any data project in which data is to be cleansed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of cleansing and migrating data comprising:
    determining a criticality score and a complexity score for identified attributes of an enterprise including a plurality of computing systems, wherein the criticality score represents a relevance of an attribute to one or more enterprise dimensions and is based on at least a designation of the attribute, and the complexity score represents complexity of cleansing data for an attribute, wherein the designation indicates the attribute as one of local data specific to one of the computing systems, common data being used across a subset comprising plural ones of the computing systems, and core data being used across each of the computing systems, and wherein determining a critically score and complexity score for identified attributes includes:
        assigning a weight to each one or more critically factors and one or more complexity factors for the identified attributes; and
        aggregating the weights of the critically factors and complexity factors for each identified attribute to produce the critically and complexity scores for the identified attributes;
    classifying the identified attributes into categories with different priorities based on the criticality and complexity scores to prioritize the identified attributes for data cleansing;
    cleansing data of the identified attributes in accordance with the priorities of the categories, wherein the identified attributes of at least one category remain uncleansed; and
    migrating data of the enterprise including cleansed and uncleansed attributes from a source system to a target system.

2. The computer-implemented method of claim 1, wherein the criticality factors include the designation of the attribute and one or more from a group of: relevance of the attribute to a strategic initiative, relevance of the attribute to a key performance indicator, relevance of the attribute to a current or planned initiative, and a data domain of the attribute.

3. The computer-implemented method of claim 1, wherein the complexity factors include one or more from a group of: a business impact of the attribute, a data volume, and a type of cleansing strategy.

4. The computer-implemented method of claim 1, wherein classifying the identified attributes includes:
    graphically visualizing the identified attributes with respect to the criticality and complexity scores to prioritize the identified attributes for data cleansing.

5. The computer-implemented method of claim 1, wherein identified attributes including greater criticality scores and lesser complexity scores have greater priority for data cleansing.

6. The computer-implemented method of claim 4, further comprising graphically visualizing attribute density of a region of a graph by clustering attributes into a plurality of groups, and displaying an indicator proportional in size to a number of attributes in each group.

7. A system for cleansing and migrating data comprising:
    at least one processor configured to:
        determine a criticality score and a complexity score for identified attributes of an enterprise including a plurality of computing systems, wherein the criticality score represents a relevance of an attribute to one or more enterprise dimensions and is based on at least a designation of the attribute, and the complexity score represents complexity of cleansing data for an attribute, wherein the designation indicates the attribute as one of local data specific to one of the computing systems, common data being used across a subset comprising plural ones of the computing systems, and core data being used across each of the computing systems, and wherein determining a critically score and complexity score for identified attributes includes:
        assigning a weight to each one or more critically factors and one or more complexity factors for the identified attributes; and aggregating the weights of the critically factors and complexity factors for each identified attribute to produce the critically and complexity scores for the identified attributes;

classify the identified attributes into categories with different priorities based on the criticality and complexity scores to prioritize the identified attributes for data cleansing;

cleanse data of the identified attributes in accordance with the priorities of the categories, wherein the identified attributes of at least one category remain uncleansed; and migrate data of the enterprise including cleansed and uncleansed attributes from a source system to a target system.

8. The system of claim 7, wherein the criticality factors include the designation of the attribute and one or more from a group of: relevance of the attribute to a strategic initiative, relevance of the attribute to a key performance indicator, relevance of the attribute to a current or planned initiative, and a data domain of the attribute.

9. The system of claim 7, wherein the complexity factors include one or more from a group of: a business impact of the attribute, a data volume, and a type of cleansing strategy.

10. The system of claim 7, wherein classifying the identified attributes includes:
displaying on a display screen the identified attributes with respect to the criticality and complexity scores to prioritize the identified attributes for data cleansing.

11. The system of claim 7, wherein identified attributes including greater criticality scores and lesser complexity scores have greater priority for data cleansing.

12. The system of claim 10, wherein the at least one processor is further configured to display on a display screen attribute density of a region of a graph by clustering attributes into a plurality of groups, and display an indicator proportional in size to a number of attributes in each group.

13. A computer program product for cleansing and migrating data comprising one or more computer readable storage media collectively having computer readable program code embodied therewith, the computer readable program code, when executed by a processor, causes the processor to:
determine a criticality score and a complexity score for identified attributes of an enterprise including a plurality of computing systems, wherein the criticality score represents a relevance of an attribute to one or more enterprise dimensions and is based on at least a designation of the attribute, and the complexity score represents complexity of cleansing data for an attribute, wherein the designation indicates the attribute as one of local data specific to one of the computing systems, common data being used across a subset comprising plural ones of the computing systems, and core data being used across each of the computing systems, and wherein determining a critically score and complexity score for identified attributes includes:
assigning a weight to each one or more critically factors and one or more complexity factors for the identified attributes; and
aggregating the weights of the critically factors and complexity factors for each identified attribute to produce the critically and complexity scores for the identified attributes;

classify the identified attributes into categories with different priorities based on the criticality and complexity scores to prioritize the identified attributes for data cleansing;

cleanse data of the identified attributes in accordance with the priorities of the categories, wherein the identified attributes of at least one category remain uncleansed; and migrate data of the enterprise including cleansed and uncleansed attributes from a source system to a target system.

14. The computer program product of claim 13, wherein the criticality factors include the designation of the attribute and one or more from a group of: relevance of the attribute to a strategic initiative, relevance of the attribute to a key performance indicator, relevance of the attribute to a current or planned initiative, and a data domain of the attribute.

15. The computer program product of claim 13, wherein the complexity factors include one or more from a group of: a business impact of the attribute, a data volume, and a type of cleansing strategy.

16. The computer program product of claim 13, wherein the computer readable program code is configured to cause the processor to:
display on a display screen the identified attributes with respect to the criticality and complexity scores to prioritize the identified attributes for data cleansing; and
display on a display screen attribute density of a region of a graph by clustering attributes into a plurality of groups, and display an indicator proportional in size to a number of attributes in each group.

17. The computer program product of claim 13, wherein identified attributes including greater criticality scores and lesser complexity scores have greater priority for data cleansing.

\* \* \* \* \*